United States Patent [19]

Heide et al.

[11] 3,957,685

[45] May 18, 1976

[54] PROCESS FOR PRODUCING CATALYST SUPPORTS OR CATALYST SYSTEMS HAVING OPEN PORES

[76] Inventors: Helmut Heide, Niederhochstadter Pfad 23, 6231 Schwalbach, Taunus; Ulrich Hoffmann, Kronthaler Weg 10, 6236 Eschborn, Niederhochstadt; Günther Brötz, Weisskirchner Str., 6372 Stierstadt, Taunus; Eva Poeschel, Hedwig-Dransfeld-Str. 2, 6 Frankfurt am Main, all of Germany

[22] Filed: Feb. 27, 1974

[21] Appl. No.: 446,266

[52] U.S. Cl............................. 252/432; 252/477 R
[51] Int. Cl.²......................................... B01J 35/04
[58] Field of Search............... 252/477 R, 448, 432, 252/438, 449, 463; 106/41; 264/44

[56] References Cited
UNITED STATES PATENTS

| | | | |
|---|---|---|---|
| 3,097,930 | 7/1963 | Holland | 264/44 X |
| 3,502,596 | 3/1970 | Sowards | 252/477 R |
| 3,755,534 | 8/1973 | Graham | 423/213.7 |
| 3,792,136 | 2/1974 | Schmitt | 264/44 |
| 3,824,196 | 7/1974 | Benbow et al. | 252/477 R |
| 3,833,386 | 9/1974 | Wood et al. | 264/44 X |

FOREIGN PATENTS OR APPLICATIONS

| | | | |
|---|---|---|---|
| 931,096 | 7/1963 | United Kingdom | 252/477 R |
| 951,306 | 3/1964 | United Kingdom | 264/44 |

*Primary Examiner*—W. J. Shine
*Attorney, Agent, or Firm*—Christen & Sabol

[57] ABSTRACT

A process for producing ceramic, ceramic-metal or metal catalyst supports or catalysts with open, interconnecting pores. The process forming a dense agglomeration of spherical, cylindrical or similar bodies of generally uniform size. These bodies are connected together at their mutual contact points, thereby producing a framework corresponding generally to the macropores and pore interconnections of the finished material in terms of size and arrangement. The framework is then filled with a suspension containing as solid components the catalyst support material and/or the catalyst material. The suspension can also contain a binding agent. The framework is subsequently dissolved away after at least the partial hardening of the cast mass without destroying the structure produced during hardening.

16 Claims, No Drawings

PROCESS FOR PRODUCING CATALYST SUPPORTS OR CATALYST SYSTEMS HAVING OPEN PORES

BACKGROUND OF THIS INVENTION

1. Field of this Invention

The present invention relates to a process for producing ceramic, metal or mixed metal-ceramic catalyst supports or catalyst systems with a given macroporosity and a microporosity which can be influenced by the production conditions.

2. Prior Art

The choice of starting materials is determined by the application range of the catalyst or catalyst systems in regard to the reaction temperature, gaseous atmosphere and nature of the catalyst material employed.

In the case of a catalyst system, it is advantageous for a maximum gas-solid material contact surface to be available —which as far as possible does not change during the course of the reaction. In this respect, it can be advantageous to use a catalyst support consisting of a material which is stable at the reaction temperature and does not form sinter. The actual catalyst material can be applied to this support by various processes. However, it is also possible to produce this kind of framework material directly from the catalyst material, provided the catalyst material is stable under reaction conditions and provided this scheme is economically feasible. It is also possible to add a certain amount of catalyst material in finely distribued form to a material inactive as a catalyst and to produce the support material and apply the catalyst material in a single operation.

Concerning the operation of this type of catalyst system it is critically important in regards to a uniform perfusion of the catalyst material for there to be complete utilization of the entire catalyst surface and a uniform period of dwell (residence or pass through time) of the reaction gases in the catalyst system, a uniform pore distribution in the catalyst system, a regular pore size and defined interconnection openings between the pores.

According to the known processes, porous, ceramic materials may be produced by skimming off or burning out specific auxiliary materials which were mixed with the crude mass. However, in the case of the materials produced according to these processes it has only been possible to obtain an irregular pore distribution and size and it is largely left to chance as to whether a junction between the individual pores is obtained. Apart from the open pores, closed pores are also produced which are ineffective when the material is used as a catalyst or a catalyst support. Apart from this, in the case of materials of this nature, irregular periods of dwell of the reaction gases in the different parts of the catalyst system occur which can lead to local overheating as a result of different reaction speeds.

DESCRIPTION OF THIS INVENTION

The object of this invention is thus to produce ceramic, metal, or ceramic-metal catalysts or catalyst systems with open macropores regular in size, distribution and arrangement and with pore junctions. The size and number of the pores and the magnitude of the pore diameter should be freely selectable in order to be able to optimally suit the porosity to the particular application.

It has been shown that this task can be solved by a process which involves first producing a framework with pores and pore junctions (interconnections or connecting channels) corresponding generally to those of the finished material, filling the framework with a pourable ceramic mass or solid suspension containing metal powder and ceramic masses or metal powder, with the addition of pulverulent catalyst metal and/or binding agents in some cases, and finally, after at least the partial hardening of this mass, disassembling or dismantling or decomposing and removing, e.g., by dissolving, the framework.

According to a preferred and advantageous embodiment of this invention, for production of the framework, into a dense heap of generally uniform spherical or cylindrical bodies is poured a liquid (solvent) which gradually dissolves the heaped material and which is removed after a short reaction period leaving a film of liquid on the bodies which forms a fluid meniscus at the contact points or edges of the bodies. As a result, thereof, there is a flow of material in the dissolving phase (solvent) between the individual filling bodies, thus producing bridges of material between the individual filling bodies. After the total evaporation of the solvent there remains an adhesive surface, the magnitude of which is influenced by the nature of the solvent, the period of dwell and other regulatable parameters; there are bridges of material from the filling bodies.

Within the scope of this invention, for production of the framework, it is possible to use insoluble filling bodies with a low melting point which are moistened with an adhesive having a low viscosity and hence are glued together at the contact points or contact surfaces, after usage. It is also possible to use filling bodies with a low melting point which are sintered at the contact points of such filling bodies by raising the temperature to a level just below their melting point. Other materials suitable for forming the framework are soluble or low melting salts, synthetic materials, wax-like substances, metals or metal alloys. It is also possible to use as the framework material substances which can be evaporated or burned substantially below the sintering temperature of the cast material.

According to this invention, the castable ceramic mass can be a liquid-solid suspension of a ceramic, vitreous-ceramic, glass or cement-like material or of another high temperature resistant material such as oxides, nitrides, silicides and borides, optionally with the addition of suitable binders. The microporosity can be influenced by the sintering process. In this case, the metal acting as a catalyst can be mixed with the castable mass as an additive.

Also suitable as the castable mass is a suspension of the catalytically effective metal powder and a binding agent. Again the microporosity can be influenced by the sintering conditions.

According to another embodiment of this invention, the catalyst support is produced from a catalytically inactive material and the metal catalyst applied by separation from the gas phase at gas pressures below 1/100 psi. or by chemical reduction from the aqueous solution. The catalytically inactive catalyst support can also be saturated with the solution of a metal salt, the metal catalyst then being produced from this metal salt by reduction using hydrogen in gaseous form.

The binding agents can be inorganic (e.g., binding clay) and organic binding agent. The binding agents or additives (when the castable ceramic mass is a liquid-solid suspension) fulfill a number of functions, such as: after removal of the water from the casting suspension they provide the shaped bodies with a certain "green strength"; they reduce the viscosity of the casting suspension and thus increase the solid material content of suspensions; they provide the casting suspension with thixotropic qualities, i.e., the casting drosses can be reversibly liquified by mechanical methods (for example, vibration); and the binder additives activate the combustion and sintering properties during the final hardening of the materials.

The type of final hardening process of the porous material depends on the starting material. It may be in the form of a ceramic firing or sintering process, or, in the case of cement-like compounds, of a hydration process.

The final structure of this invention can be used with fluid systems, both gaseous and liquid.

Other features, advantages and applications of the present invention will be made apparent from the following description of an embodiment of this invention which relates to the production of a defined porous $Al_2O_3$ body. The following example represents the most preferred embodiment of this invention.

EXAMPLE

Fine-grained $Al_2O_3$ type XA 16 produced by Alcoa was used as the starting material. Small quantities of bonding clay and organic binding agents were added to this starting material, along with water, to form a dross or casting suspension.

Polystyrene spheres or balls were used to produce the supporting framework which corresponded in its construction to the subsequent pore form and distribution. These balls were generally an ideal round shape but varied in diameter from approximately 0.2 to 2 mm. For this reason, more precise screen fractions were produced in order to obtain a homogeneous pile of spherical bodies, these being:

```
0.2 - 0.4 mm
0.4 - 0.6 mm
0.6 - 0.8 mm
0.8 - 1.0 mm
   > 1.0 mm.
```

These screen fractions were shaken in a hollow cylinder closed on one side by a perforated bottom to form dense agglomerations of the spherical bodies, the charged mass of spherical bodies being simultaneously compressed. Having been charged in this manner, the mold was then dipped in a receptacle containing an acetone-water admixture and allowed to remain there for a certain period of time. Acetone has a dissolving effect on polystyrene which can be altered as desired by the admixture of water with the acetone. After removing the mold from the solvent mixture the excess acetone was removed from the agglomerated spherical bodies using compressed air leaving only a thin film of solvent on the spherical bodies. Contact meniscuses of a solution saturated with polystyrene formed at the points of contact of the spherical bodies. On evaporation of the water and acetone, these bodies cemented together the spherical bodies on their contact surfaces. The magnitude of these contact surfaces which later become the pore passages in the porous material can be controlled by the concentration of the solvent and the period of dwell of the agglomerated spherical bodies in the solvent. The supporting framework of spherical bodies produced in this way was saturated with the $Al_2O_3$ dross or casting suspension, from which the water was subsequently removed by a drying process. After opening the mold the polystyrene framework was partially depolymerized by careful heating and finally decomposed. On termination of this process, the blank was heated to 1600°C. and sintered for 2 hours at this temperature.

Cylindrical bodies of this material could be used, for example, as substrate material for a nickel catalyst and be coated with nickel uniformly over the entire pore surface by way of the CVD process (chemical vapor deposition process) via $Ni(CO)_4$ decomposition at a pressure of 1/100 psi.

Similarly, such substrate materials can also be produced from an aqueous solution by the chemical reduction of suitable metal salts with catalytically effective metals, for example, nickel or palladium — through reduction by means of hydrazine.

What is claimed is:

1. A process for producing a solid ceramic catalyst, a solid ceramic-metal catalyst, a solid metal catalyst, a solid ceramic catalytic support, a solid ceramic-metal catalytic support or a solid metal catalytic support, having open interconnecting pores using a framework in the production process which comprises (a) forming a dense agglomeration of spherical bodies of approximately uniform size, said spherical bodies being insoluble bodies having a low melting point or bodies which are soluble in a solvent, and said spherical bodies being capable of being dissolved, evaporated or burned to remove the framework, and (b) connecting together these bodies at their mutual contact points, the initial mutual points of contact of the spherical bodies being enlarged by attachment to each other by means of (i) dissolution, the bodies being connected together by pouring a solvent, which gradually dissolves the material of the spherical bodies, into said dense agglomeration of spherical bodies and by removing said solvent after a short reaction period leaving a film of said solvent on the bodies which forms a fluid meniscus on the contact points of the bodies, (ii) gluing or (iii) sintering into larger areas or surfaces of contact, whereby a framework corresponding in size and arrangement generally to the macropores and pore interconnections of said catalyst metal, said catalyst ceramic, said catalyst ceramic-metal, said catalytic metal support, catalytic ceramic support or said catalytic ceramic-metal support is produced, (c) filling the framework with a suspension containing, as the solid component, said catalyst metal or said catalyst ceramic or said catalyst ceramic-metal or said catalytic support metal or said catalytic support ceramic or said catalytic support ceramic-metal, said framework being prepared from spherical bodies capable of being evaporated or burned substantially below the sintering temperature of said solid component of said suspension used as the framework material, (d) partially or completely hardening said suspension by applying sufficient heat to effect said partial or complete hardening, (e) dissolving away or removing the framework without destroying the structure produced during such partial or complete hardening, said removal of the framework being achieved by applying sufficient heat to evaporate or burn said framework, and (f) if there has been only partial hardening of the cast mass, completely hardening said suspension by applying sufficient heat to effect said complete hardening.

2. A process according to claim 1 wherein the suspension also contains a solid binding agent.

3. A process as described in claim 2 wherein said solid binding agent is a binding clay.

4. A process according to claim 1 wherein said solvent is an acetone and water mixture.

5. A process according to claim 1 wherein said solvent is removed by evaporation via a heating step.

6. A process as described in claim 1 wherein said ceramic catalytic support is $Al_2O_3$.

7. A process as described in claim 1 wherein said suspension contains added pulverant catalyst metal, a metal powder dross stabilized by a binding agent or a mixture thereof.

8. A process as described in claim 1 wherein the spherical bodies are connected together by being moistened with an adhesive having a low viscosity and being glued together thereby at the contact points and wherein the spherical bodies are insoluble.

9. A process according to claim 1 wherein, to produce said framework, said spherical bodies are sintered at their contact points by raising the temperature to just below their melting point, and wherein said spherical bodies have a low melting point.

10. A process according to claim 9 wherein said framework material is polystyrene.

11. A process according to claim 9 wherein a liquid-solid suspension of (i) a ceramic, (ii) a vitreous ceramic, (iii) a glass or (iv) a high temperature resistant material selected from the group consisting of an oxide, nitride, silicide or boride material, and a suitable binding additive, is used as said suspension, the microporosity of the resulting material being capable of being influenced by the sintering process.

12. A process according to claim 11 wherein metal acting as a catalyst is added to said suspension.

13. A process according to claim 11 wherein said suspension contains a catalytically active metal powder mixed with a suitable binding agent, the microporosity of the resulting material being capable of being influenced by the sintering conditions.

14. A process according to claim 11 wherein said catalyst support consists of a catalytically-inactive metal, ceramic or ceramic-metal and a metal catalyst is applied to said catalyst support, after the framework is removed by separation from the gaseous phase at gas pressures below approximately 1/100 psi.

15. A process according to claim 11 wherein the catalyst support consists of a catalytically inactive material metal, ceramic or ceramic-metal, and a metal catalyst is applied to said catalyst support, after the framework is removed by chemical reduction from the aqueous phase.

16. A process according to claim 11 wherein said catalyst support after the framework is removed, is saturated with the solution of a metal salt, and a metal catalyst is produced from said metal salt by reduction using hydrogen in the gaseous form.

* * * * *